US012738802B2

(12) United States Patent
Yin et al.

(10) Patent No.: US 12,738,802 B2
(45) Date of Patent: Sep. 15, 2026

(54) FAN CASING, BLOWER ASSEMBLY, AND VEHICLE AIR CONDITIONING SYSTEM

(71) Applicant: Luxshare Intelligent Manufacture Technology (Changshu) Co., Ltd, Changshu City (CN)

(72) Inventors: Hui Yin, Changshu City (CN); Bin Wang, Changshu City (CN)

(73) Assignee: LUXSHARE INTELLIGENT MANUFACTURE TECHNOLOGY (CHANGSHU) CO., LTD, Changshu City (CN)

( * ) Notice: Subject to any disclaimer, the term of this patent is extended or adjusted under 35 U.S.C. 154(b) by 0 days.

(21) Appl. No.: 19/020,896

(22) Filed: Jan. 14, 2025

(65) Prior Publication Data

US 2026/0149331 A1 May 28, 2026

(30) Foreign Application Priority Data

Nov. 25, 2024 (CN) ........................ 202411697549.0

(51) Int. Cl.
*H02K 5/24* (2006.01)
*B60H 1/00* (2006.01)
(Continued)

(52) U.S. Cl.
CPC ........... *H02K 5/24* (2013.01); *B60H 1/00428* (2013.01); *B60H 1/00521* (2013.01);
(Continued)

(58) Field of Classification Search
CPC .......... H02K 5/24; H02K 9/227; H02K 21/22; B60H 1/00428; B60H 1/00521;
(Continued)

(56) References Cited

U.S. PATENT DOCUMENTS 6,339,267 B1 * 1/2002 Fujii ..................... F16F 1/3732 310/91
9,777,735 B2 * 10/2017 Post .................... F04D 25/0653
2009/0114205 A1 * 5/2009 Post ........................ F24H 3/065 126/110 R
2009/0263242 A1 * 10/2009 Winkler ................ F04D 29/601 415/213.1

(Continued)

FOREIGN PATENT DOCUMENTS

CN 106877614 A 6/2017
CN 212412886 U 1/2021

(Continued)

OTHER PUBLICATIONS

Taiwanese Office Action and Search Report for Taiwanese Application No. 114104026, dated Oct. 8, 2025, with English translation.

*Primary Examiner* — Mark A Laurenzi
*Assistant Examiner* — Benjamin Doyle
(74) *Attorney, Agent, or Firm* — Birch, Stewart, Kolasch & Birch, LLP

(57) ABSTRACT

Provided are a fan casing, a blower assembly, and a vehicle air conditioning system, relating to the field of fan technology. The fan casing includes a mounting shell, a heat dissipation member, and a damping assembly. The mounting shell is provided with multiple limiting grooves and a mounting space for holding a stator-rotor assembly. The heat dissipation member includes a heat dissipation plate located inside the mounting shell. The multiple securing portions are disposed at the edge of the heat dissipation plate. The damping assembly includes multiple damping members. The multiple damping members are spaced apart along a first direction. The damping member is disposed in a corresponding limiting groove, and a pocket groove is disposed at the end of the damping member facing the central axis of the mounting shell. Each of the multiple securing portions is limited in a corresponding pocket groove.

16 Claims, 12 Drawing Sheets

(51) Int. Cl.

| | |
|---|---|
| ***F04D 25/08*** | (2006.01) |
| ***F04D 29/40*** | (2006.01) |
| ***F04D 29/58*** | (2006.01) |
| ***F04D 29/66*** | (2006.01) |
| ***H02K 9/22*** | (2006.01) |
| ***H02K 21/22*** | (2006.01) |

(52) U.S. Cl.

CPC ........... *F04D 25/08* (2013.01); *F04D 29/582* (2013.01); *F04D 29/668* (2013.01); *H02K 9/227* (2021.01); *H02K 21/22* (2013.01); *B60H 2001/006* (2013.01); *F04D 29/403* (2013.01)

(58) Field of Classification Search

CPC . B60H 2001/006; F04D 25/08; F04D 29/582; F04D 29/668; F04D 29/403

USPC ............................................... 417/410.1, 363

See application file for complete search history.

(56) References Cited

U.S. PATENT DOCUMENTS

| | | | | |
|---|---|---|---|---|
| 2010/0254826 | A1* | 10/2010 | Streng ..................... | F04D 25/06 417/44.1 |
| 2012/0074802 | A1* | 3/2012 | Oi ............................ | H02K 5/10 310/67 R |
| 2018/0226857 | A1* | 8/2018 | Ishizaki ................ | F04D 29/668 |
| 2024/0333088 | A1* | 10/2024 | Jung ...................... | H02K 11/33 |

FOREIGN PATENT DOCUMENTS

| | | | | |
|---|---|---|---|---|
| CN | 215911976 U | | 2/2022 | |
| CN | 216767821 U | | 6/2022 | |
| CN | 218633571 U | | 3/2023 | |
| CN | 220452257 | * | 8/2023 | ............. F04D 25/06 |
| CN | 220452257 U | | 2/2024 | |
| TW | M668895 U | | 4/2025 | |

* cited by examiner

FAN CASING, BLOWER ASSEMBLY, AND VEHICLE AIR CONDITIONING SYSTEM

CROSS-REFERENCE TO RELATED APPLICATION

This application claims priority to Chinese patent application No. 202411697549.0 filed with the China National Intellectual Property Administration (CNIPA) on Nov. 25, 2024, the disclosure of which is incorporated herein by reference in its entirety.

TECHNICAL FIELD

The present disclosure relates to the field of fan technology, particularly a fan casing, a blower assembly, and a vehicle air conditioning system.

BACKGROUND

A vehicle air conditioning system is used for cooling, heating, ventilation, and purification of the air in a vehicle cabin, thereby providing a comfortable environment for passengers. A blower is an important component of a vehicle air conditioning system and is used for driving the flow of air. Noise produced during the operation of a blower affects the comfort of passengers.

In the related art, a blower includes a casing, a stator, a rotor, and an impeller. The stator and the rotor are at least partially mounted inside the casing. The impeller is connected to the rotor via a rotary shaft. When rotating, the rotor drives the impeller to rotate, thus driving the air. During the operation of the blower, stator windings are energized to create a magnetic field to drive the rotor that includes magnetic steel. The energized windings generate a large amount of heat, so the casing typically also includes a heat dissipation member to dissipate heat from the windings. In the related art, the heat dissipation member is located inside the casing and is detachably connected to the casing. During operation, the blower generates vibrations, causing the heat dissipation member to move relative to the casing and collide with the casing, thereby generating a relatively high noise.

SUMMARY

The present disclosure provides a fan casing that produces a low noise.

The present disclosure further provides a blower assembly that produces a low noise.

The present disclosure further provides a vehicle air conditioning system that produces a low noise.

The present disclosure provides a fan casing. The fan casing includes a mounting shell, a heat dissipation member, and a damping assembly.

The mounting shell is provided with multiple limiting grooves and a mounting space for holding a stator-rotor assembly.

The heat dissipation member includes a heat dissipation plate located inside the mounting shell. The multiple securing portions are disposed at the edge of the heat dissipation plate.

The damping assembly includes multiple damping members. The multiple damping members are spaced apart along a first direction. The damping member is disposed in a corresponding limiting groove, the end of the damping member in the first direction, the end of the damping member in a second direction, and the end of the damping member facing away from the central axis of the mounting shell are abutted against the groove wall of the corresponding limiting groove, and a pocket groove is disposed at the end of the damping member facing the central axis of the mounting shell. Pocket grooves on the multiple damping members are in one-to-one correspondence with the multiple securing portions. The securing portion is limited in a corresponding pocket groove.

The first direction is the circumferential direction of the mounting shell, the second direction is perpendicular to the first direction, and the second direction is the axial direction of the mounting shell.

In some embodiments, the securing portion is clamped in the corresponding pocket groove in the second direction.

In some embodiments, the damping member has at least one clamping group, at least part of each of the at least one clamping group is located inside the pocket groove corresponding to the damping member, a clamping group of the at least one clamping group includes two clamping blocks opposite to each other in the second direction, and the securing portion corresponding to the damping member is clamped between the two clamping blocks.

In some embodiments, two surfaces of the securing portion in the second direction are each provided with multiple protrusions, the multiple protrusions are spaced apart along the first direction and located inside the pocket groove corresponding to the securing portion, and one clamping block is disposed between two protrusions adjacent in the first direction and on the same surface of the two surfaces of the securing portion.

In some embodiments, the damping member is provided with a mounting through hole passing through the damping member along the second direction, multiple ribs extending along the second direction are disposed on the inner wall of the mounting through hole, and the mounting shell has a damping column passing through the mounting through hole.

In some embodiments, the pocket groove has an arc-shaped groove wall, the arc-shaped groove wall curves away from the central axis of the mounting shell, the securing portion includes an arc-shaped fitting surface, and the arc-shaped fitting surface is abutted against the arc-shaped groove wall.

In some embodiments, two abutting end walls of the damping member in the first direction are each an inclined wall, and the length of the end of the damping member facing the central axis of the mounting shell is less than the length of the end of the damping member facing away from the central axis of the mounting shell. Here the length of the end of the damping member facing the central axis of the mounting shell and the length of the end of the damping member facing away from the central axis of the mounting shell are each a length extending along the first direction.

In some embodiments, the outer wall of the damping member has an abutting protrusion that is abutted against the groove wall of the corresponding limiting groove; and/or an extending protrusion is disposed at the end face of the end of the damping member facing the central axis of the mounting shell and configured to contact a part of the heat dissipation plate. Here the part of the heat dissipation plate is a part other than the plurality of securing portions.

In some embodiments, three damping members, three limiting grooves, and three securing portions are provided. The three securing portions are evenly spaced apart along the first direction.

The present disclosure further provides a blower assembly includes the fan casing.

The present disclosure further provides a vehicle air conditioning system includes the fan casing.

BRIEF DESCRIPTION OF DRAWINGS

To illustrate technical solutions in embodiments of the present disclosure more clearly, the drawings used in the description of the embodiments of the present disclosure are briefly described below. Apparently, the drawings described below illustrate only part of the embodiments of the present disclosure, and those of ordinary skill in the art may obtain other drawings based on the content of the embodiments of the present disclosure and the drawings on the premise that no creative work is done.

REFERENCE LIST

Figure 1:
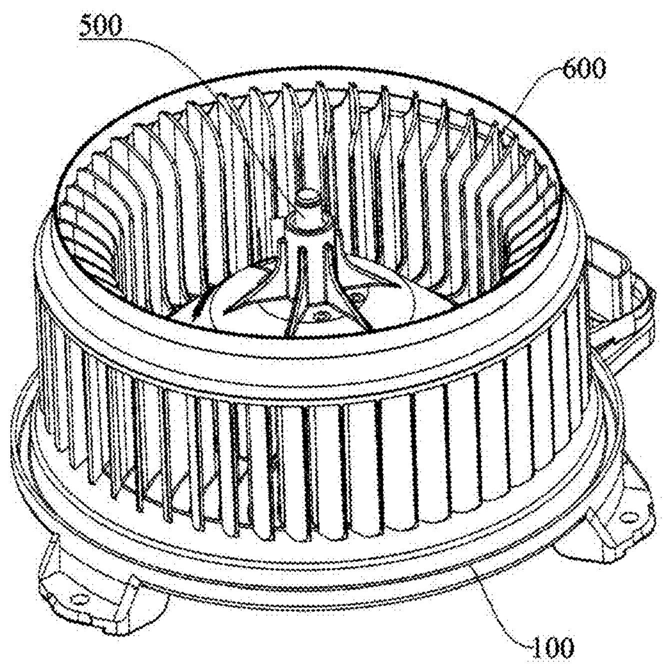
FIG. 1 is a structure view of a blower assembly according to an embodiment of the present disclosure.

100 mounting shell
110 limiting groove
120 mounting space
130 mounting shell body
1301 assembly opening
1302 mounting opening
131 first shell
1311 damping column
132 second shell
140 rear cover
141 first reinforcing rib
142 reinforcing boss
143 cover body
144 mounting boss
1441 first clamping groove
1442 first boss surface
1443 second boss surface
1444 second clamping groove
145 mounting groove
146 outer cover surface
1461 first step surface
1462 second step surface
147 energy-absorbing groove
148 horizontal plate
149 vertical plate
**14*a*** third reinforcing rib
150 positioning pillar
151 elastic support protrusion
200 heat dissipation member
201 heat dissipation plate
210 securing portion
211 protrusion
212 arc-shaped mating surface
220 positioning hole
230 heat dissipation column
300 damping assembly
310 damping member
311 pocket groove
3111 arc-shaped groove wall
312 abutting end wall
320 clamping group
321 clamping block
330 mounting through hole
331 rib
340 abutting protrusion
350 extending protrusion
400 elastic sealing ring
410 skirt portion
411 first arc-shaped surface
412 second arc-shaped surface
420 extending portion
421 third arc-shaped surface
430 second reinforcing rib
440 sealing ring body
450 first elastic protrusion
460 second elastic protrusion
500 stator-rotor assembly
510 stator group
511 enameled wire
512 tab
520 magnetic tile
530 housing
540 rotary shaft
550 tab damping rubber
560 tab retainer
570 first bearing
580 second bearing
600 impeller
700 wiring block

800 circuit board
X first direction
Y second direction
Z central axis

DETAILED DESCRIPTION

To make the solved technical problems, adopted technical solutions, and achieved technical effects of the present disclosure more apparent, the technical solutions of the present disclosure are further described below in conjunction with the drawings and the embodiments. It is to be understood that the embodiments described herein are intended to explain the present disclosure and not to limit the present disclosure. Additionally, it is to be noted that for ease of description, only part, not all, of structures related to the present disclosure are illustrated in the drawings.

It is to be noted that similar reference numerals and letters represent similar items in the drawings. Therefore, once an item is defined in one drawing, the item no longer needs to be defined and interpreted in the subsequent drawings.

In the description of the present disclosure, unless otherwise expressly specified and limited, the term "connected to each other", "connected", or "secured" is to be construed in a broad sense, for example, as securely connected, detachably connected, or integrated; mechanically connected or electrically connected; directly connected to each other or indirectly connected to each other via an intermediary; or internally connected or interactional between two components. For those of ordinary skill in the art, specific meanings of the preceding terms in the present disclosure may be understood based on specific situations.

In the present disclosure, unless otherwise expressly specified and limited, when a first feature is described as "above" or "below" a second feature, the first feature and the second feature may be in direct contact or be in contact via another feature between the two features. Moreover, when the first feature is described as "on", "above", or "over" the second feature, the first feature is right on, above, or over the second feature, the first feature is obliquely on, above, or over the second feature, or the first feature is simply at a higher level than the second feature. When the first feature is described as "under", "below", or "underneath" the second feature, the first feature is right under, below, or underneath the second feature, the first feature is obliquely under, below, or underneath the second feature, or the first feature is simply at a lower level than the second feature. In the description of the embodiments herein, "multiple" means two or more unless otherwise specified.

In the description of this embodiment, the orientation or position relationships indicated by terms "above", "below", "right" and the like are based on the orientation or position relationships shown in the drawings, merely for ease of description and simplifying operation, and these relationships do not indicate or imply that the referred device or element has a specific orientation and is constructed and operated in a specific orientation, and thus they are not to be construed as limiting the present disclosure. In addition, the terms "first" and "second" are used only for distinguishing between descriptions and have no special meaning.

It is to be noted that when a component is described as being "fixed to" or "disposed on" another component, it may be directly on the particular component or intervening components may be on the particular component.

Solutions in the present disclosure are further described below in conjunction with the drawings and embodiments.

An embodiment provides a blower assembly that can produce a low noise and can offer higher comfort when applied to a vehicle air conditioning system.

Figure 2:
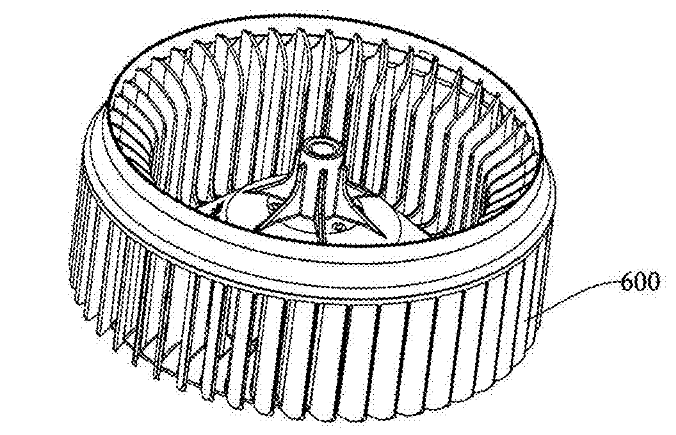
FIG. 2 is a first exploded view of a blower assembly according to an embodiment of the present disclosure.
Figure 2:
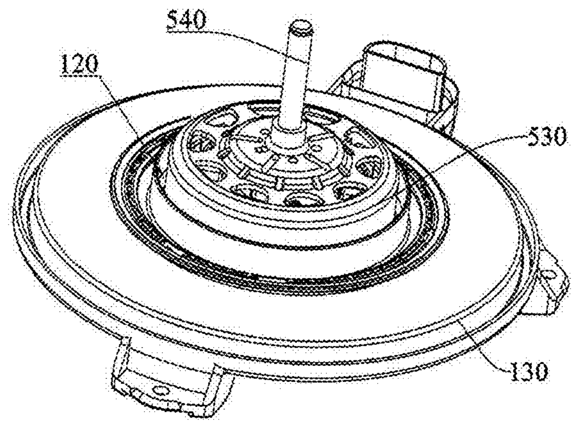
Figure 3:
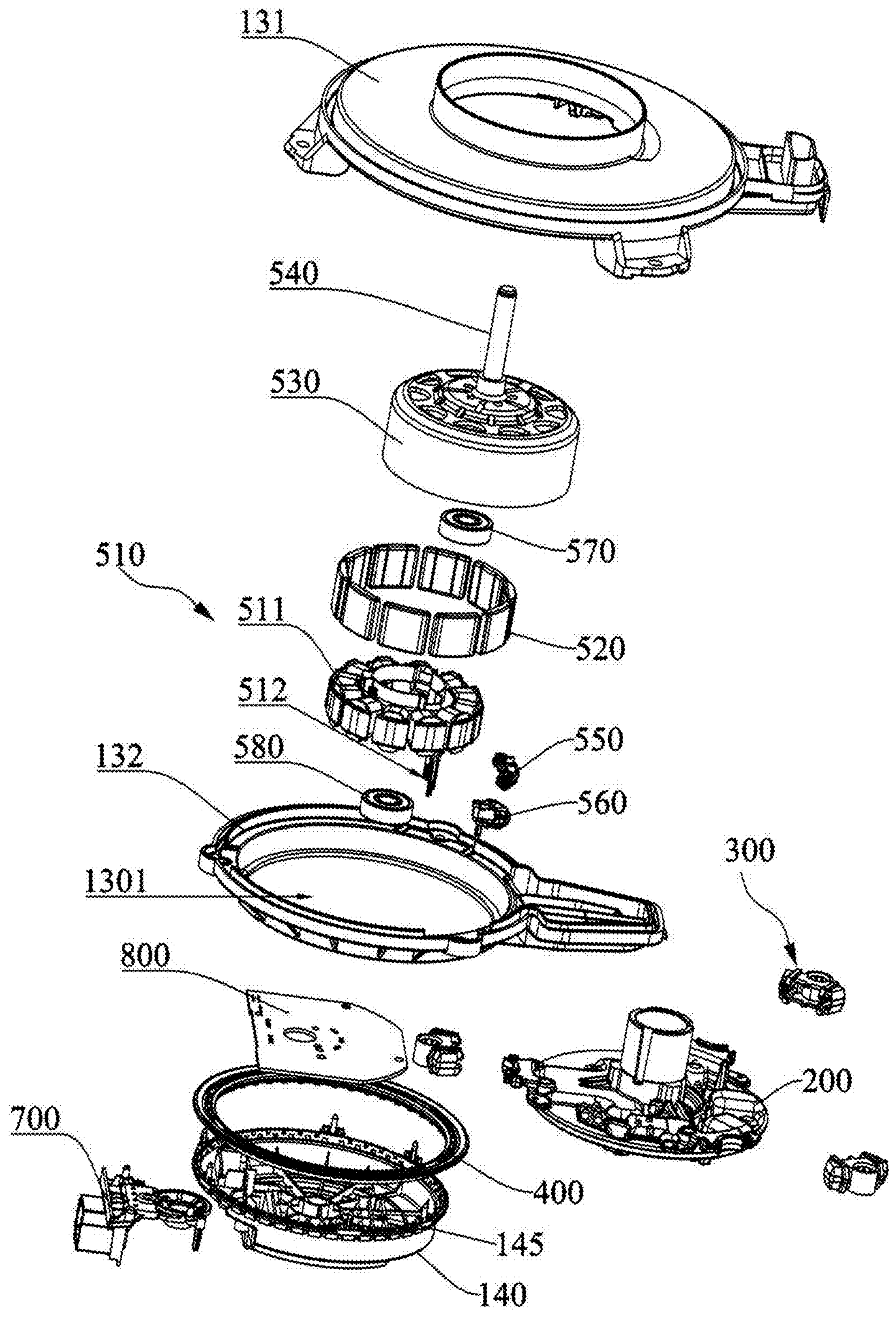
FIG. 3 is a second exploded view of a blower assembly according to an embodiment of the present disclosure.

As shown in FIGS. 1 to 3, the blower assembly includes at least a fan casing, a stator-rotor assembly 500, a wiring block 700, and a circuit board 800.

The circuit board 800 is disposed inside the fan casing. The wiring block 700 is mounted on the fan casing and electrically connected to the circuit board 800. The wiring block 700 is configured to receive a connector to supply power to the circuit board 800. As shown in FIG. 3, the stator-rotor assembly 500 is at least partially mounted inside the fan casing. The stator-rotor assembly 500 includes a stator group 510, a magnetic tile 520, a housing 530, a rotary shaft 540, a first bearing 570, and a second bearing 580. The stator group 510 is fixedly connected to the fan casing. An enameled wire 511 of the stator group 510 is electrically connected to the circuit board 800. Illustratively, the enameled wire 511 is electrically connected to the circuit board 800 through the tab 512, allowing the power transmitted to the circuit board 800 to be transmitted to the enameled wire 511. The tab 512 is fixedly connected to the fan casing through a tab retainer 560. The tab retainer 560 is also provided with a tab damping rubber 550. The tab damping rubber 550 is disposed between the tab 512 and the tab retainer 560. The tab damping rubber 550 can reduce the noise produced by the collision between the tab 512 and the tab retainer 560.

In this embodiment, the magnetic tile 520 is disposed around the periphery of the stator group 510 and is fixedly connected to the inner circumferential wall of the housing 530. When energized, the enameled wire 511 generates a magnetic field to drive the magnetic tile 520 and the housing 530 to rotate. For details about the driving principle, see the related art, and this embodiment will not be described in detail here. The rotary shaft 540 is coaxially connected to the housing 530, enabling the rotary shaft 540 to rotate along with the housing 530. One end of the rotary shaft 540 is rotatably mounted on the fan casing through the first bearing 570 and the second bearing 580. The other end of the rotary shaft 540 extends to outside the fan casing and is coaxially connected to the impeller 600. The circuit board 800 transmits power to the enameled wire 511. As a winding, the enameled wire 511 generates a magnetic field when energized, driving the magnetic tile 520 to rotate. The magnetic tile 520 drives the housing 530 and the rotary shaft 540 to rotate. The rotary shaft 540 drives the impeller 600 to rotate, thereby propelling the flow of fluid through the impeller 600.

Figure 5:
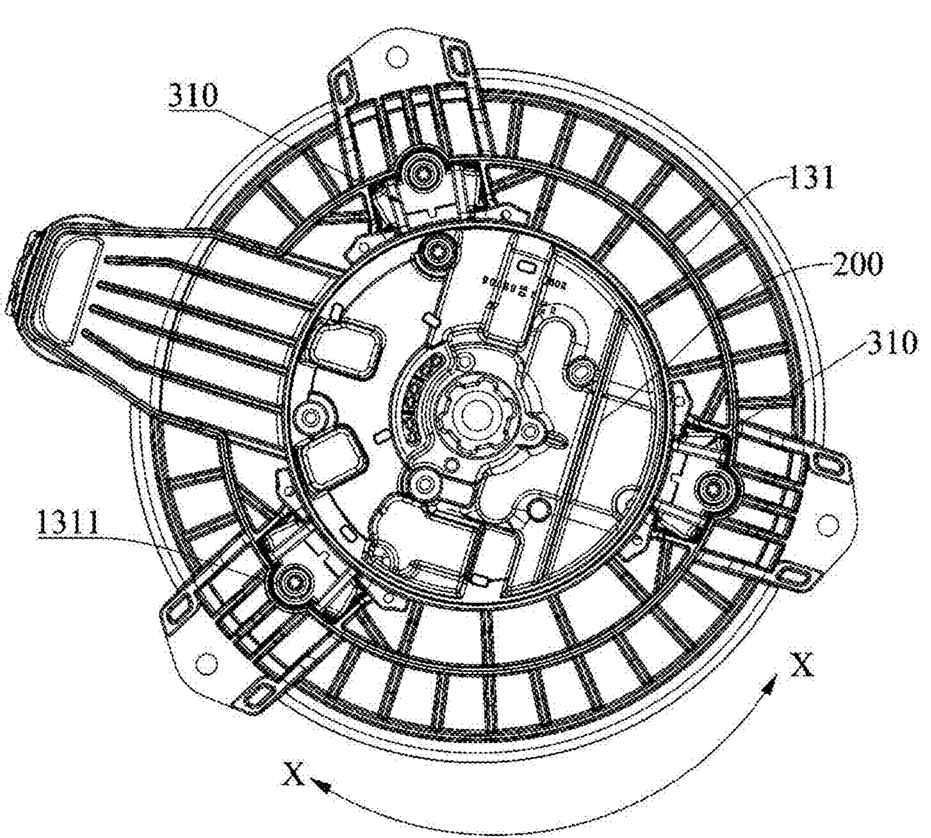
FIG. 5 is a second structure view of a fan casing according to an embodiment of the present disclosure.
Figure 6:
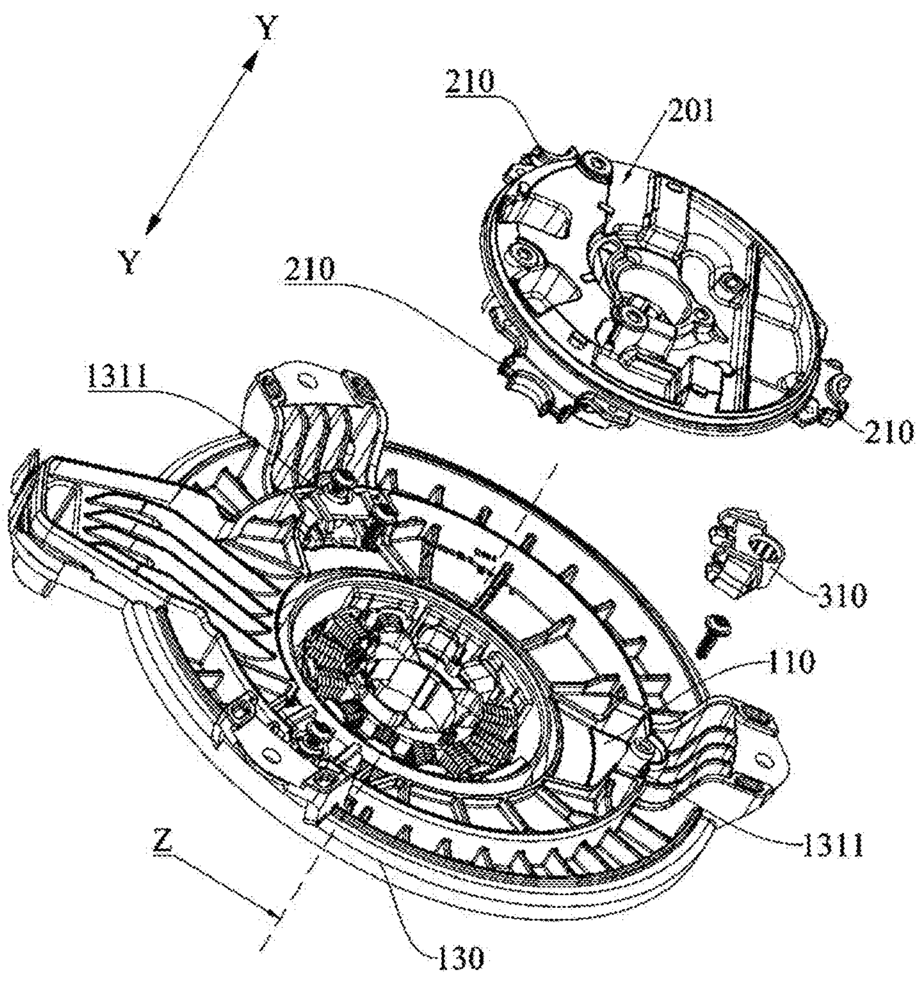
FIG. 6 is an exploded view of a fan casing according to an embodiment of the present disclosure.

Illustratively, the fan casing includes a mounting shell 100, a heat dissipation member 200, and a damping assembly 300. For ease of description, this embodiment defines a first direction X and a second direction Y. As shown in FIG. 5, the first direction X is the circumferential direction of the mounting shell 100. As shown in FIG. 6, the second direction Y is the axial direction of the mounting shell 100. In other words, the first direction X is perpendicular to the second direction Y. The axial direction of the mounting shell 100, the axial direction of the rotary shaft 540, the axial direction of the stator group 510, and the axial direction of the impeller 600 are the same.

Referring to FIG. 6, the mounting shell 100 is provided with multiple limiting grooves 110. Illustratively, the multiple limiting grooves 110 are spaced apart along the first direction X. Additionally, as shown in FIG. 2, the mounting shell 100 has a mounting space 120 for holding the stator-rotor assembly 500. At least part of the stator-rotor assembly 500 is mounted in the mounting space 120.

In this embodiment, the heat dissipation member 200 is used for the heat dissipation of the blower assembly. Referring to FIG. 6, the heat dissipation member 200 of this embodiment includes a heat dissipation plate 201 located inside the mounting shell 100. Multiple securing portions 210 are disposed at the edge of the heat dissipation plate 201 and are spaced apart along the first direction X. Illustratively, the securing portions 210 protrude from the heat dissipation plate 201 in a direction away from the axis of the heat dissipation plate 201.

Figure 7:
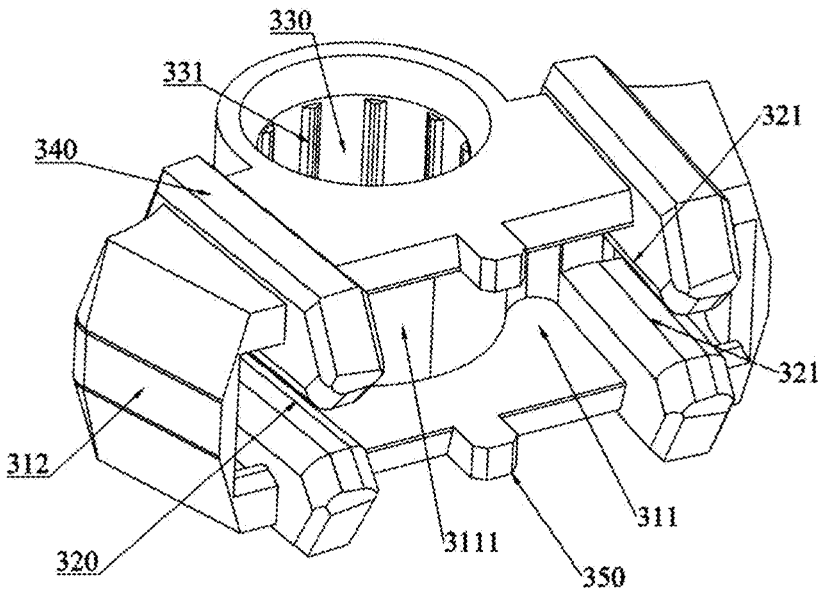
FIG. 7 is a structure view of a damping member according to an embodiment of the present disclosure.

In this embodiment, the damping assembly 300 is configured to reduce the noise between the mounting shell 100 and the heat dissipation plate 201. As shown in FIG. 5 and FIG. 6, the damping assembly 300 includes multiple damping members 310 spaced apart along the first direction X. The multiple damping members 310 are in one-to-one correspondence with the multiple limiting grooves 110. Each damping member 310 is disposed in a corresponding limiting groove 110. In this embodiment, the end of the damping member 310 in the first direction X, the end of the damping member 310 in the second direction Y, and the end of the damping member 310 facing away from the central axis Z of the mounting shell 100 are all abutted against the groove wall of the corresponding limiting groove 110. This allows the limiting groove 110 to limit the movement of the damping member 310 in the first direction X and second direction Y and also limit the movement of the damping member 310 away from the axis of the mounting shell 100. Referring to FIG. 6 and FIG. 7, each damping member 310 has one pocket groove 311 formed at the end of the damping member 310 facing the central axis Z of the mounting shell 100. The multiple pocket grooves 311 are in one-to-one correspondence with the multiple securing portions 210. Each securing portion 210 is limited in its corresponding pocket groove 311. This allows the heat dissipation plate 201 to be connected to the mounting shell 100 through multiple damping members 310.

It is to be noted that the damping member 310 of this embodiment is an elastic structure, meaning that the damping member 310 has a damping function, that is, the ability to generate elastic deformation. Illustratively, the damping member 310 may achieve damping through its structure, for example, by having an internal elastic structure such as a spring. The damping member 310 may also achieve damping through its material, for example, by being made of an elastic material such as rubber or silicone. This is not limited by this embodiment.

The mounting shell 100 of this embodiment is provided with multiple limiting grooves 110 for limiting the damping members 310 so that the mounting shell 100 can limit the movement of the damping members 310 along the first direction X, the second direction Y, and the direction away from the central axis Z of the mounting shell 100. The damping members 310 are provided pocket grooves 311 at their end faces facing the central axis Z of the mounting shell 100, and the securing portions at the edge of the heat dissipation plate 201 can be placed in the corresponding pocket grooves 311 and limited within the pocket grooves 311, thereby limiting the movement of the damping members 310 along the first direction X, the second direction Y, and the direction away from the central axis Z of the mounting shell 100. The multiple damping members 310 are spaced apart along the first direction X so that the damping members 310 support the heat dissipation member 200 at different positions of the damping members 310 along the first direction X, preventing the heat dissipation member 200 from translating relative to the mounting shell 100 in a direction perpendicular to the second direction Y. This prevents both translational and rotational movement of the heat dissipation member 200 relative to the mounting shell 100. The heat dissipation member 200 is connected to the mounting shell 100 through the damping members 310, preventing a direct contact between the heat dissipation member 200 and the mounting shell 100 and preventing a collision between the heat dissipation member 200 and the mounting shell 100 during vibration. By buffering the collision between the heat dissipation member 200 and the mounting shell 100, the damping members 310 help reduce the noise produced during such collision. As a result, the fan casing, blower assembly, and vehicle air conditioning system produce a low noise during operation, enhancing the noise reduction performance of the blower assembly. When applied in the vehicle air conditioning system, the blower assembly can produce a low noise, improving the comfort of a vehicle that uses the air conditioning system.

In some embodiments, three damping members 310, three limiting grooves 110, and three securing portions 210 are provided. The three securing portions 210 are evenly spaced in the first direction X, meaning they are arranged at 120° intervals along the edge of the heat dissipation plate 201. The three damping members 310 are also arranged at 120° intervals, improving the uniformity of supporting the heat dissipation plate 201. This ensures that the three damping members 310 bear the load evenly, enhancing the uniformity of wear on the damping members 310, and preventing premature failure of any one damping member 310 due to excessive wear. However, an excessive number of damping members 310 is unnecessary, as it would increase the weight of the fan casing, being unfavorable for the lightweight design of the fan casing. If fewer than three damping members 310 are provided, it would reduce the balance of supporting the heat dissipation plate 201, potentially causing the heat dissipation plate 201 to rotate relative to the mounting shell 100.

Figure 10:
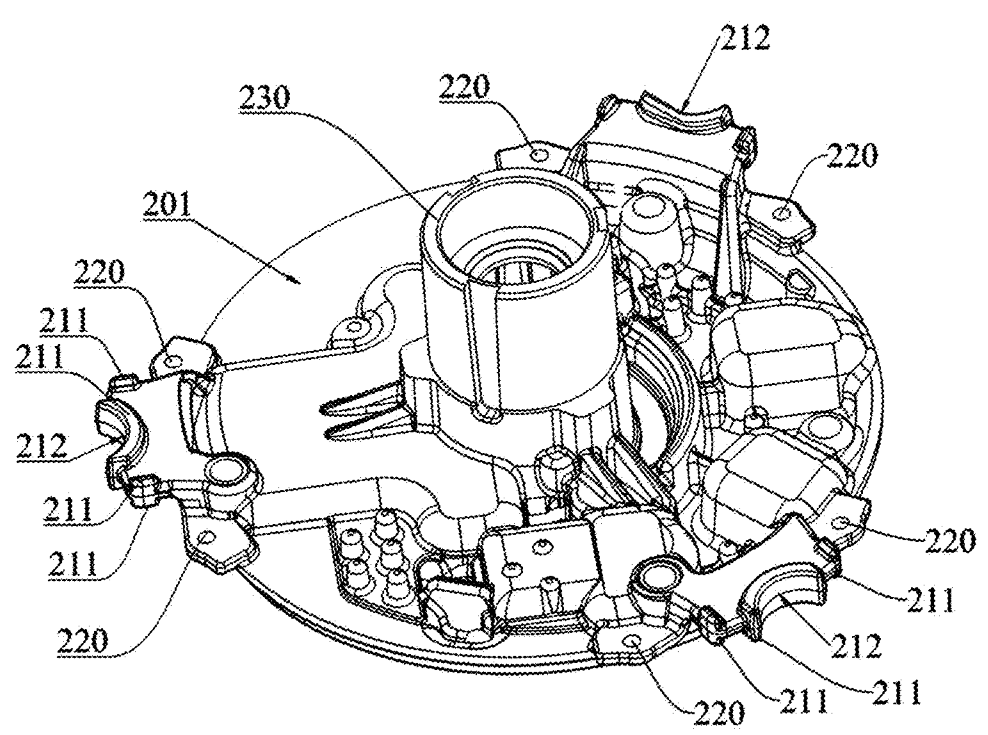
FIG. 10 is a first structure view of a heat dissipation member according to an embodiment of the present disclosure.

In some embodiments, the stator-rotor assembly 500 is mounted on the heat dissipation member 200. As shown in FIG. 10, the heat dissipation member 200 also includes a heat dissipation column 230 coaxially connected to the heat dissipation plate 201. The heat dissipation column 230 is a hollow structure. The first bearing 570 and the second bearing 580 are both disposed inside the heat dissipation column 230 to achieve a rotational connection between the rotary shaft 540 and the heat dissipation column 230. The stator group 510 is riveted to the heat dissipation member 200. In an example, the stator group 510 is riveted to the heat dissipation column 230, allowing the heat dissipation column 230 to absorb the heat generated by the enameled wire 511 of the stator group 510 and efficiently dissipate heat from the enameled wire 511.

Illustratively, the limiting method of the securing portion 210 in the pocket groove 311 may take various forms. In this embodiment, the securing portion 210 is clamped in the corresponding pocket groove 311 in the second direction Y, thereby enhancing the integration of the securing portion 210 with the damping member 310 and thus better improving the damping and noise reduction effects of the damping member 310.

Figure 9:
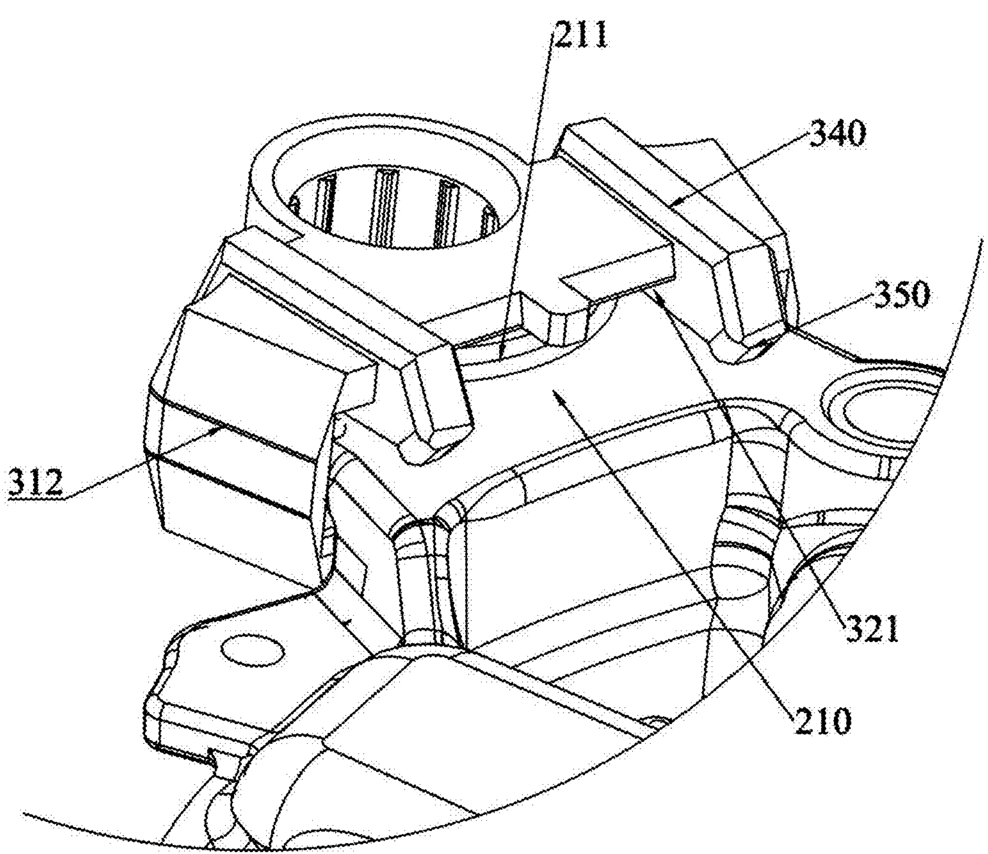
FIG. 9 is an assembly view of a damping member and a heat dissipation plate according to an embodiment of the present disclosure.

In some embodiments, as shown in FIG. 7 and FIG. 9, the damping member 310 has at least one clamping group 320. At least part of each clamping group 320 is located inside the pocket groove 311. In other words, the clamping group 320 may include a part inside the pocket groove 311 and a part outside the pocket groove 311. Each clamping group 320 includes two clamping blocks 321 facing away from each other in the second direction Y. The securing portion 210 is clamped between the two clamping blocks 321. The clamping method of using clamping blocks 321 enables point securing of the securing portion 210 and enables a relatively small contact area between the securing portion 210 and the clamping block 321. Compared with surface securing, this design reduces the difficulty of inserting the securing portion 210 into the pocket groove 311 while ensuring the clamping effect, thereby lowering the assembly difficulty of the fan casing. In this embodiment, the part of the clamping block 321 outside the pocket groove 311 may be abutted against the part of the heat dissipation plate 201 other than the securing portion 210. This enables point contact with the part of the heat dissipation plate 201 other than the securing portion 210, creating a buffering space between the damping member 310 and the part of the heat dissipation plate 201 other than the securing portion 210 and thus facilitating buffering of the heat dissipation plate 201.

In this embodiment, when multiple clamping groups 320 are provided, the multiple clamping groups 320 are spaced apart along the first direction X to enhance the strength of clamping the securing portion 210.

In some embodiments, as shown in FIG. 10, two surfaces of the securing portion 210 in the second direction Y are each provided with multiple protrusions 211, the multiple protrusions 211 are spaced apart along the first direction X and located inside the pocket groove 311 corresponding to the securing portion 210, and one clamping block 321 is disposed between two protrusions 211 adjacent in the first direction X and on the same surface of the two surfaces of the securing portion 210 such that the protrusions 211 and the clamping blocks 321 are alternately arranged in the first direction X. This arrangement enhances the reliability of the damping member 310 in securing the securing portion 210 in the second direction Y, better improving the damping effect on the heat dissipation member 200. In some embodiments, the clamping block 321 is clamped between two protrusions 211 adjacent in the first direction X, better enhancing the integration between the heat dissipation plate 201 and the damping member 310.

Figure 11:
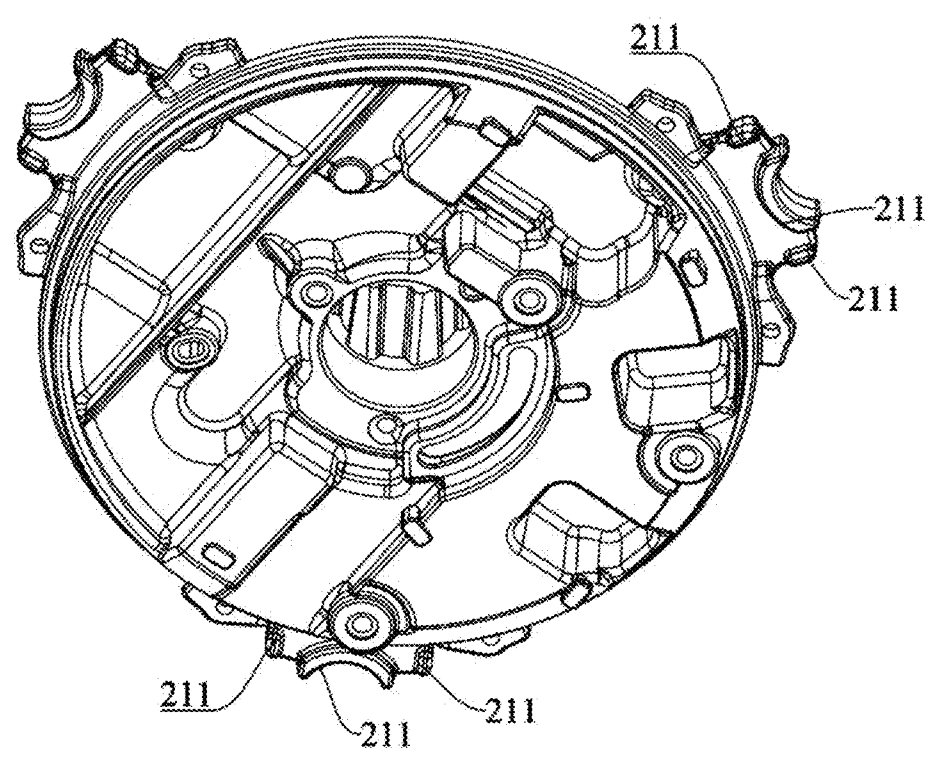
FIG. 11 is a second structure view of a heat dissipation member according to an embodiment of the present disclosure.
Figure 12:
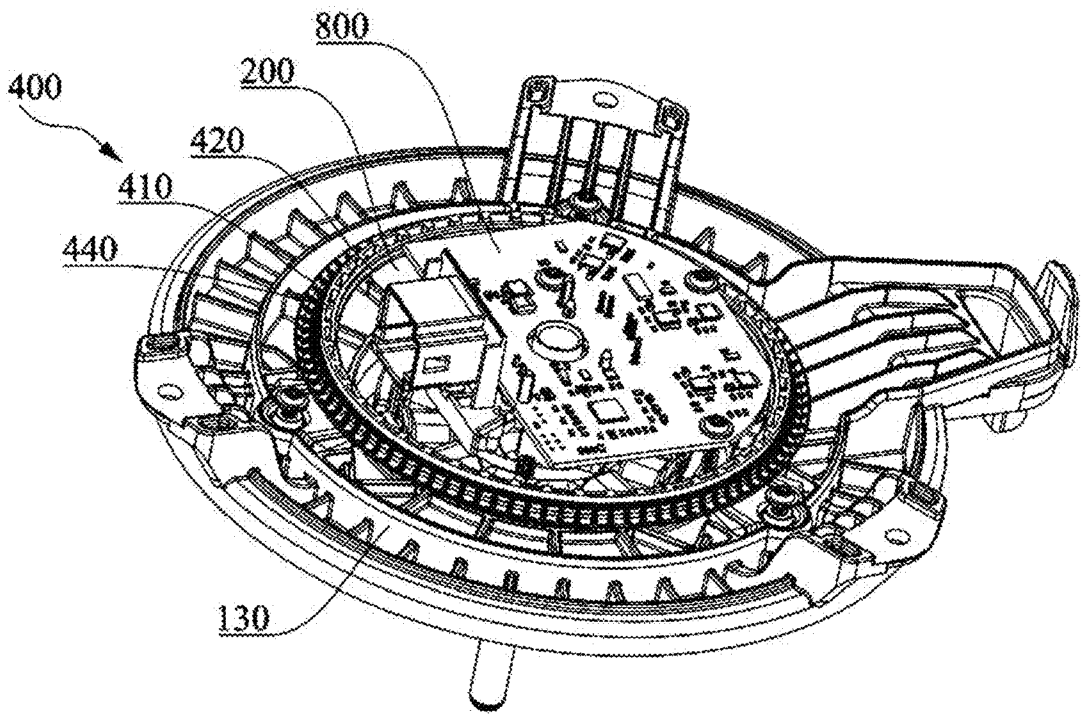
FIG. 12 is a structure view of part of a fan casing according to an embodiment of the present disclosure.

Referring to FIG. 10 and FIG. 11, the protrusions 211 are disposed at the edge of the securing portion 210, allowing the positioning and assembly of the securing portion 210 and the damping member 310 to be achieved by alignment with the gap between the clamping block 321 and the adjacent protrusion 211.

Figure 8:
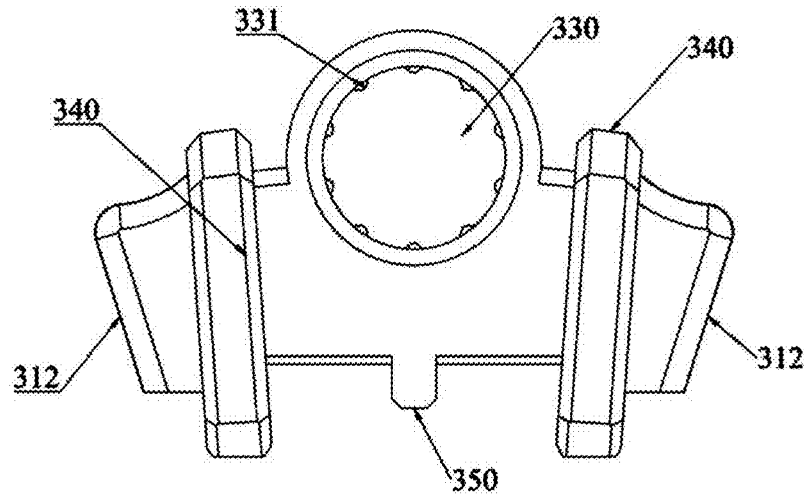
FIG. 8 is a top view of a damping member according to an embodiment of the present disclosure.
Figure 20:
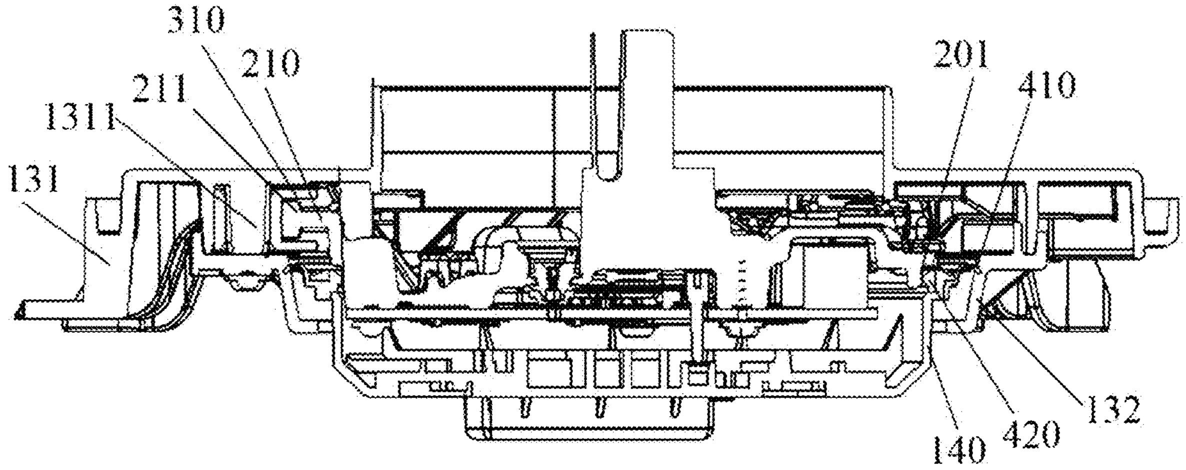
FIG. 20 is a section view of a fan casing according to an embodiment of the present disclosure.

Illustratively, as shown in FIG. 7 or FIG. 8, the damping member 310 is provided with a mounting through hole 330 that passes through the damping member 310 along the second direction Y. In this embodiment, the inner wall of the mounting through hole 330 is provided with multiple ribs 331 that extend along the second direction Y. The multiple ribs 331 are spaced apart along the circumferential direction of the mounting through hole 330. As shown in FIG. 6 and FIG. 20, the mounting shell 100 has a damping column 1311 passing through the mounting through hole 330. The multiple ribs 331 on the hole wall of the mounting through hole 330 can uniformly contact the damping column 1311 when the damping member 310 vibrates, thus ensuring that the vibrations generated during the operation of the blower assembly can be well dispersed onto the damping column 1311. Moreover, the multiple ribs 331 can also provide good centering.

Figure 4:
FIG. 4 is a first structure view of a fan casing according to an embodiment of the present disclosure.
Figure 4:
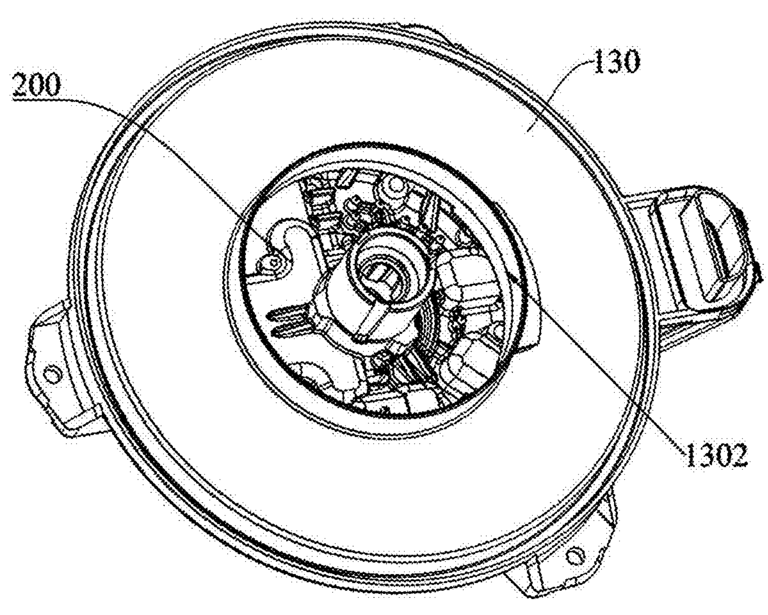

In some embodiments, as shown in FIG. 2, the mounting shell 100 includes a mounting shell body 130. As shown in FIG. 3, one side of the mounting shell body 130 along its axial direction has an assembly opening 1301. As shown in FIG. 4, the other side of the mounting shell body 130 along its axial direction has a mounting opening 1302 for holding the stator-rotor assembly 500. Illustratively, the mounting shell body 130 includes a first shell 131 and a second shell 132. At least part of the heat dissipation member 200 is located within the mounting shell body 130 and is connected to the mounting shell body 130.

In this embodiment, the mounting shell body 130 is provided with multiple limit grooves 110. The heat dissipation plate 201 is disposed within the space formed by the first shell 131 and the second shell 132. The first shell 131 has a mounting space 120 for holding the stator-rotor assembly 500. The first shell 131 and the second shell 132 cooperate to form the limit groove 110. For example, the recess of the first shell 131 facing the second shell 132 cooperates with the second shell 132 to form the limit groove 110, or the recess of the second shell 132 facing the first shell 131 cooperates with the first shell 131 to form the limit groove 110. Alternatively, the recess of the first shell 131 and the recess of the second shell 132 cooperate to form the limit groove 110. This is not limited by this embodiment. The damping column 1311 is disposed on the surface of the first shell 131 facing the second shell 132. A bolt passes through the second shell 132 and is screwed to the damping column 1311 to connect the first shell 131 and the second shell 132.

In some embodiments, the mounting through hole 330 and the pocket groove 311 are independent of each other. The mounting through hole 330 is located on the side of the pocket groove 311 facing away from the central axis Z of the mounting shell 100. That is, in this embodiment, the side of the damping member 310 facing the central axis Z of the mounting shell 100 is a pocket-shaped structure while the side of the damping member 310 facing away from the central axis Z of the mounting shell 100 is a ring-shaped structure. The pocket-shaped structure is used for damping and noise reduction between the heat dissipation plate 201 and the mounting shell 100. The ring-shaped structure is used for damping and noise reduction between the first shell 131 and the second shell 132. In this manner, the fan casing has a high damping and noise reduction performance.

In this embodiment, the pocket groove 311 has an arc-shaped groove wall 3111. The arc-shaped groove wall 3111 curves away from the central axis Z of the mounting shell 100. The securing portion 210 includes an arc-shaped fitting surface 212. Specifically, the surface of the securing portion 210 facing away from the central axis Z of the mounting shell 100 includes an arc-shaped fitting surface 212. The arc-shaped fitting surface 212 is abutted against the arc-shaped groove wall 3111.

In some embodiments, the multiple protrusions 211 on the securing portion 210 include arc-shaped blocks. The outer lateral surface of the arc-shaped block is coplanar with the arc-shaped fitting surface 212 such that the arc-shaped block forms a structure similar to a claw clamped onto the arc-shaped groove wall 3111, thereby improving the support effect of the heat dissipation plate 201 in the radial direction of the mounting shell 100.

In some embodiments, as shown in FIG. 7 and FIG. 8, the pocket groove 311 of the damping member 310 is tapered, meaning that the area of the opening of the pocket groove 311 is less than the area of the inside of the pocket groove 311.

Illustratively, the two abutting end walls 312 of the damping member 310 in the first direction X are inclined walls, meaning that the damping member 310 is a semi-trapezoidal structure. In this manner, the contact between the abutting end wall 312 of the damping member 310 and the groove wall of the limiting groove 110 (that is, the mounting shell 100) is a point contact, ensuring that the heat dissipation plate 201 and the heat dissipation column 230 are well aligned, thereby ensuring better alignment of the stator-rotor assembly 500 mounted on the heat dissipation column 230. Additionally, the vibration generated during the operation of the blower assembly is able to be effectively transmitted to the mounting shell 100 through the abutting end wall 312, and the point contact can also have a certain vibration damping effect. Moreover, the abutting end wall 312 of the damping member 310 makes point contact with the mounting shell 100 in the first direction X, leaving a part of the abutting end wall 312 not in contact with the mounting shell 100, thus creating a gap between the abutting end wall 312 and the mounting shell 100. This gap allows for slight movement of the damping member 310 relative to the mounting shell 100 in the first direction X.

In some embodiments, the length of the end of the damping member 310 facing the central axis Z of the mounting shell 100 in the first direction X is less than the length of the end of the damping member 310 facing away from the central axis Z of the mounting shell 100 in the first direction X. That is, along the direction from the damping member 310 to the central axis Z of the mounting shell 100, the length of the damping member 310 in the first direction X gradually decreases. In this manner, on the one hand, the contact position of the abutting end wall 312 with the limiting groove 110 is closer to the bottom of the limiting groove 110, reducing the likelihood of failure of the contact between the abutting end wall 312 and the limiting groove 110 due to vibration, thus improving the reliability of the limiting groove 110 in limiting the damping member 310. On the other hand, at the opening of the limiting groove 110, there is a larger buffer space between the damping member 310 and the groove wall of the limiting groove 110. This buffer space is used for buffering the vibration of the heat dissipation member 200, preventing the heat dissipation plate 201 from generating a large collision with the groove wall of the limiting groove 110 during vibration, thereby reducing damage to the damping member 310 and avoiding the generation of a large noise.

In this embodiment, the part of the abutting end wall 312 for contacting the groove wall of the limiting groove 110 is arc-shaped so as to serve a buffering function.

In some embodiments, as shown in FIG. 7, the outer wall of the damping member 310 has an abutting protrusion 340 that is abutted against the groove wall of the limiting groove 110. The abutting protrusion 340 that is abutted against the groove wall of the limiting groove 110 enables multiple buffering spaces to be formed between the damping member 310 and the groove wall of the limiting groove 110. The buffering spaces are used for buffering the collision between the heat dissipation plate 201 and the mounting shell 100, reducing damage to the damping member 310 and preventing the generation of a large noise.

Illustratively, as shown in FIG. 7 and FIG. 8, the two outer lateral walls of the damping member 310 in the second direction Y and the outer side of the end wall of the damping member 310 facing away from the central axis Z of the mounting shell 100 are each provided with one or more abutting protrusions 340 so as to form multiple buffering spaces. The abutting protrusions 340 on the outer lateral walls of the damping member 310 in the second direction Y are in one-to-one correspondence with the clamping blocks 321 inside the pocket groove 311. Orthogonal projection of each abutting protrusion 340 in the first direction X coincides with orthogonal projection of the corresponding clamping block 321 in the first direction X.

Figure 21:
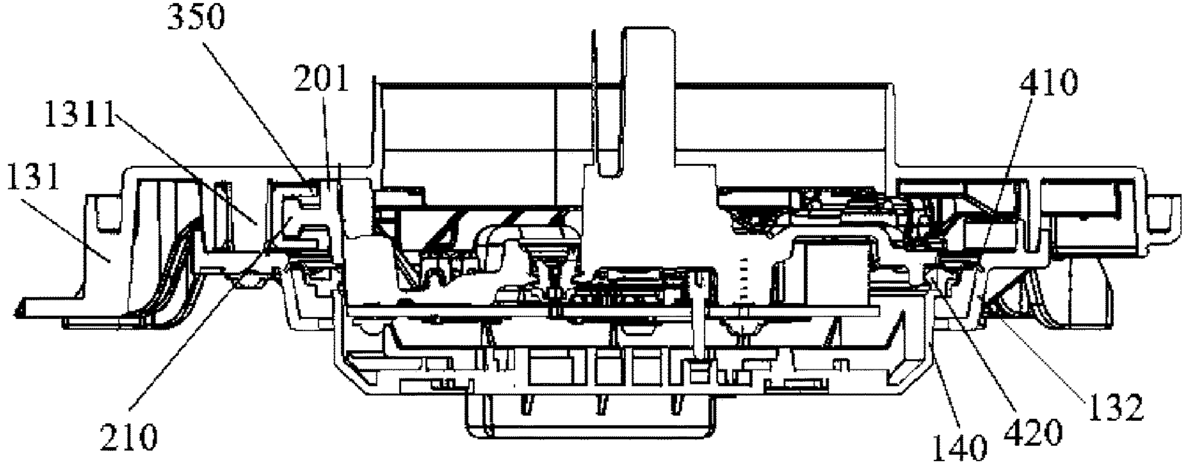
FIG. 21 is a section view of a fan casing according to an embodiment of the present disclosure.

In some embodiments, as shown in FIG. 7 and FIG. 8, the end face of the end of the damping member 310 facing the central axis Z of the mounting shell 100 is provided with multiple spaced extending protrusions 350 that are able to contact the part of the heat dissipation plate 201 excluding the securing portions 210, as shown in FIG. 21. In this embodiment, the length of the extending protrusion 350 is less than the length of the part of the clamping block 321 located outside the pocket groove 311. It is to be noted that when the blower assembly is not operating, the extending protrusion 350 does not contact the heat dissipation plate 201, that is, there is a gap between them. When the blower assembly is running and the vibration amplitude is large, the part of the heat dissipation plate 201 excluding the securing portions 210 first compresses the part of the clamping block 321 located outside the pocket groove 311, causing the part of the clamping block 321 located outside the pocket groove 311 to deform; and then compresses the extending protrusion 350 so that the cooperation between the extending protrusion 350 and the clamping block 321 forms double buffering effects, better improving the damping effect and the noise reduction performance.

In some embodiments, the damping member 310 is an integrated structure, not only facilitating manufacturing but also providing a higher damping strength.

In some embodiments, as shown in FIG. 3, the mounting shell 100 of this embodiment also includes a rear cover 140. One side of the mounting shell body 130 has an assembly opening 1301. The rear cover 140 is disposed at the assembly opening 1301. The rear cover 140 of this embodiment is provided with radial first reinforcing ribs 141. The first reinforcing ribs 141 can improve the structural strength of the rear cover 140 and also has the effect of reducing noise.

In some embodiments, as shown in FIG. 3, the fan casing further includes an elastic sealing ring 400. The elastic sealing ring 400 is disposed at the edge of the rear cover 140 and is used for sealing and vibration damping between the rear cover 140 and the mounting shell body 130. In this embodiment, the elastic sealing ring 400 is secured to the edge of the rear cover 140.

In some embodiments, as shown in FIGS. 12 to 16, the elastic sealing ring 400 includes a skirt portion 410 and an extending portion 420. The skirt portion 410 extends towards the mounting shell body 130 and is sealingly abutted against the mounting shell body 130. The extending portion 420 extends towards the heat dissipation member 200 and is sealingly abutted against the heat dissipation member 200. In an example, the skirt portion 410 is sealingly abutted against the second shell 132. The extending portion 420 is sealingly abutted against the heat dissipation plate 201. Moreover, the elastic sealing ring 400 seals the gap between the mounting shell body 130 and the rear cover 140 and the gap between the heat dissipation member 200 and the rear cover 140, forming a more sealed mounting shell 100. Moreover, the elastic sealing ring 400 is a structure having a certain degree of elasticity, that is, the elastic sealing ring 400 is a resilient structure. For example, the elastic sealing ring 400 may be made of an elastic material such as rubber or silicone. The elastic sealing ring 400 can buffer collisions between the mounting shell body 130 and the rear cover 140 and the gap between the rear cover 140 and the heat dissipation plate 201, thus providing a high noise reduction performance.

The fan casing of this embodiment includes an elastic sealing ring 400 disposed on the rear cover 140. The skirt portion 410 of the elastic sealing ring 400 extends towards the mounting shell body 130, and the extending portion 420 of the elastic sealing ring 400 extends towards the heat dissipation member 200. This arrangement allows the elastic sealing ring 400 to seal the gap between the mounting shell body 130 and the rear cover 140 and the gap between the heat dissipation member 200 and the rear cover 140. As a result, the part of the mounting shell body 130 facing the rear cover 140 can be more tightly sealed, improving the sealing performance of the mounting shell 100. Additionally, when the blower assembly generates vibrations during operation, the gap between the mounting shell body 130 and the rear cover 140 and the gap between the heat dissipation member 200 and the rear cover 140 can be buffered by the elastic sealing ring 400. This ensures that the mounting shell body 130 does not directly collide with the rear cover 140, and the rear cover 140 does not directly collide with the heat dissipation member 200, thereby reducing the collision noise in the fan casing. As a result, the fan casing and the blower assembly that uses the fan casing can operate with a low noise, contributing to the quiet operation of the blower assembly.

Figure 13:
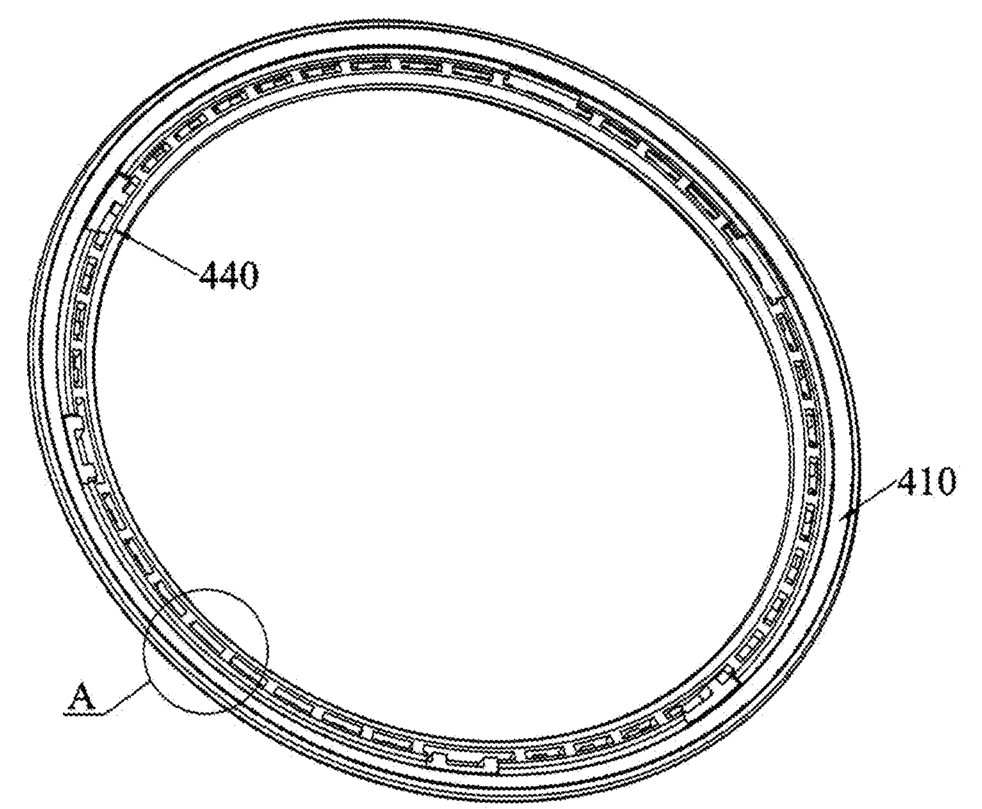
FIG. 13 is a structure view of an elastic sealing ring according to an embodiment of the present disclosure.
Figure 14:
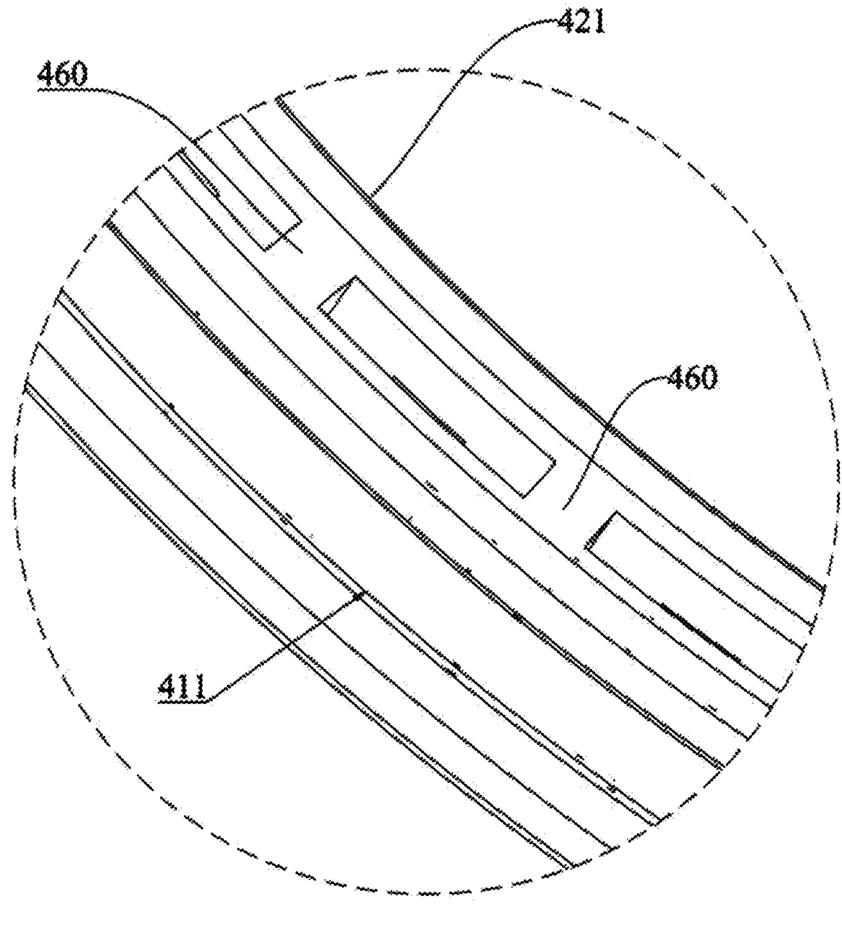
FIG. 14 is an enlarged view of part A of FIG. 13 of the present disclosure.

In some embodiments, as shown in FIG. 13 and FIG. 14, the skirt portion 410 is ring-shaped and arc-shaped. The arc-shaped skirt portion 410 can produce a larger elastic deformation, thus adapting to changes in the gap between the mounting shell body 130 and the rear cover 140, offering higher adaptability. Illustratively, the skirt portion 410 curves towards the bottom of the mounting shell 100. In this embodiment, the skirt portion 410 includes a first arc-shaped surface 411 that is sealingly abutted against the mounting shell body 130, providing a large contact area between the skirt portion 410 and the mounting shell body 130, thereby enhancing the sealing performance. Moreover, when the mounting shell body 130 moves relative to the rear cover 140, the first arc-shaped surface 411 can compress the skirt portion 410, facilitating the arc-shaped skirt portion 410 to deform radially, better buffering the vibrations of the mounting shell body 130 and reducing noise.

Figure 15:
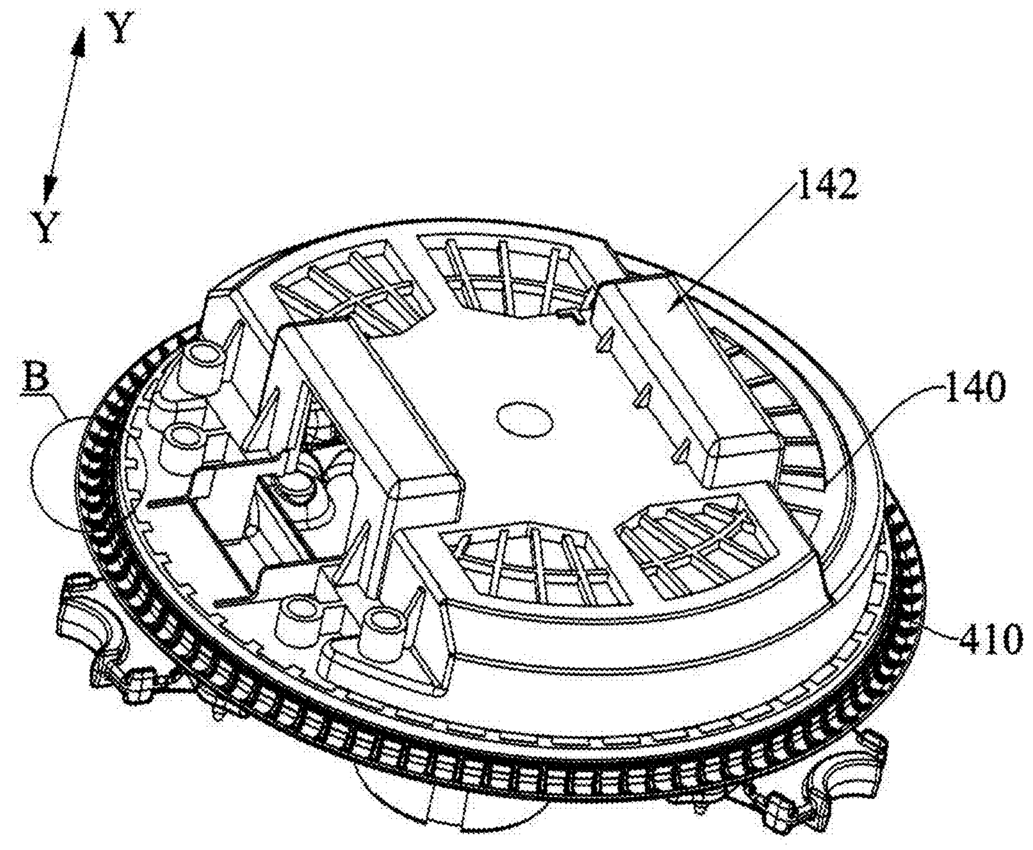
FIG. 15 is an assembly view of an elastic sealing ring, a rear cover, and a heat dissipation member according to an embodiment of the present disclosure.
Figure 16:
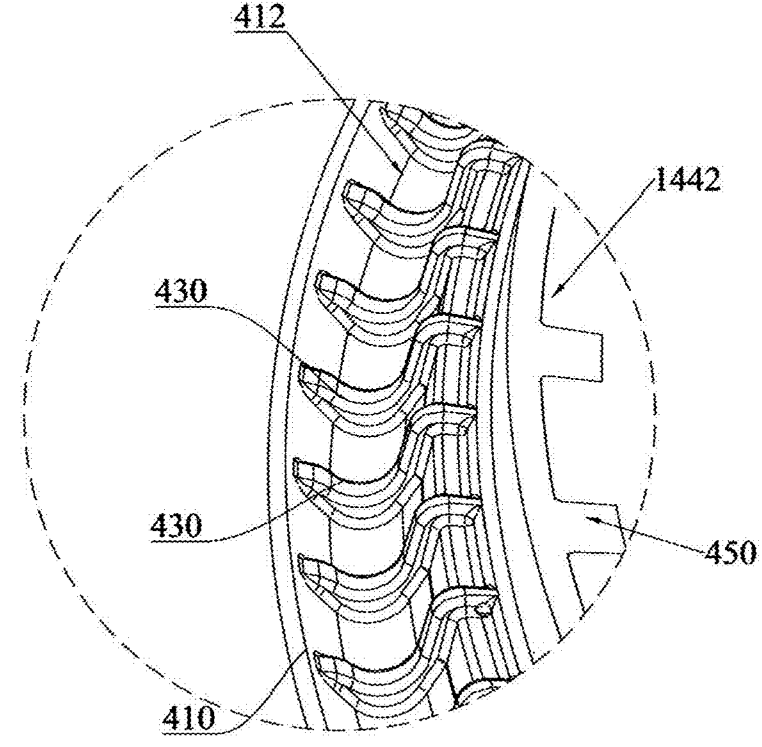
FIG. 16 is an enlarged view of part B of FIG. 15 of the present disclosure.

In some embodiments, as shown in FIG. 15 and FIG. 16, the skirt portion 410 also includes a second arc-shaped surface 412 that faces away from the first arc-shaped surface 411. The first arc-shaped surface 411 and the second arc-shaped surface 412 are opposite to each other in the second direction Y. The second arc-shaped surface 412 has multiple second reinforcing ribs 430 spaced along the circumferential direction of the elastic sealing ring 400. The second reinforcing ribs 430 are used for increasing the structural strength of the skirt portion 410, enhancing the resistance of the skirt portion 410 to deformation. This allows the skirt portion 410 to be better supported between the mounting shell body 130 and the rear cover 140, better improving the vibration resistance and noise reduction performance of the mounting shell 100.

In some embodiments, in this embodiment, the second reinforcing ribs 430 extend from the inner edge of the skirt portion 410 to the outer edge of the skirt portion 410. That is, for each second reinforcing rib 430, one end of the second reinforcing rib 430 extends to the side of the second arc-shaped surface 412 facing the axis of the elastic sealing ring 400, and the other end of the second reinforcing rib 430 extends to the side of the second arc-shaped surface 412 facing away from the axis of the elastic sealing ring 400, so that the second reinforcing ribs 430 provide better support.

In some embodiments, as shown in FIG. 14, the elastic sealing ring 400 further includes a sealing ring body 440. The sealing ring body 440 is disposed at the edge of the rear cover 140. The skirt portion 410 is connected to the outer side of the sealing ring body 440 in the circumferential direction. The extending portion 420 is connected to the inner side of the sealing ring body 440 in the circumferential direction. The extending portion 420 of this embodiment includes a third arc-shaped surface 421 that is sealingly abutted against the heat dissipation member 200. The third arc-shaped surface 421 can increase the contact area between the extending portion 420 and the heat dissipation member 200. The extending portion 420 has a large deformation capacity so that the extending portion 420 can adapt to changes in the gap between the heat dissipation member 200 and the rear cover 140, improving the sealing performance and the noise reduction performance.

Figure 17:
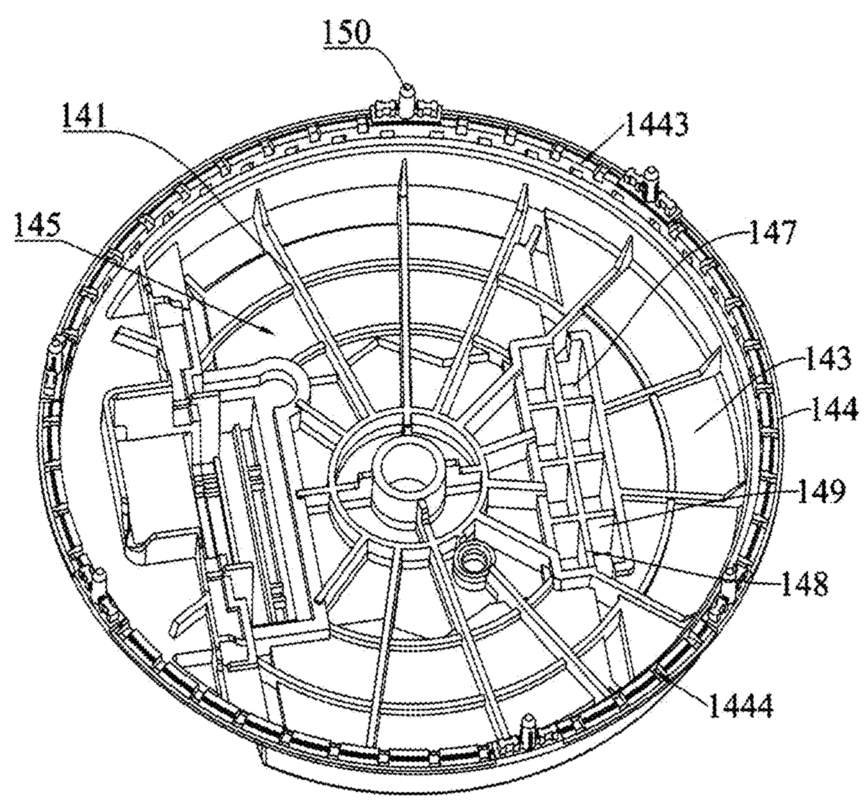
FIG. 17 is a first structure view of a rear cover according to an embodiment of the present disclosure.
Figure 18:
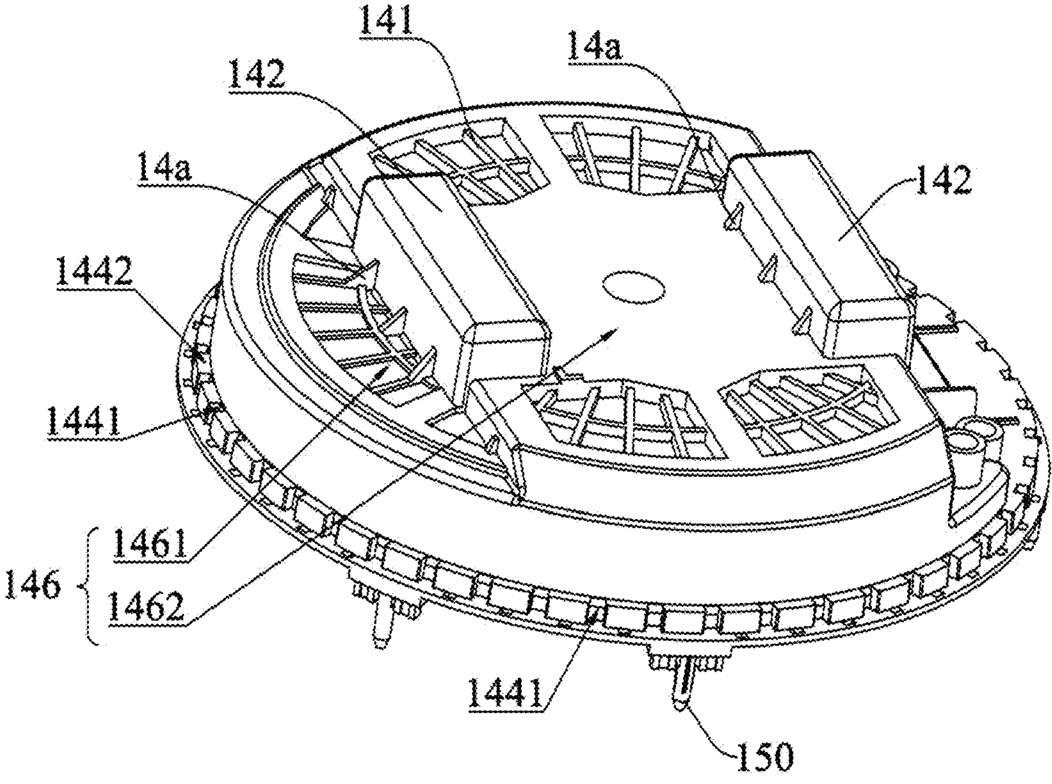
FIG. 18 is a second structure view of a rear cover according to an embodiment of the present disclosure.

In some embodiments, as shown in FIG. 17, the rear cover 140 includes a cover body 143 and a mounting boss 144 located at the edge of the cover body 143. At least part of the elastic sealing ring 400 is disposed on the mounting boss 144. For example, the sealing ring body 440 of the elastic sealing ring 400 is connected to the mounting boss 144. Additionally, as shown in FIG. 18, the mounting boss 144 has multiple first clamping grooves 1441 spaced along the circumferential direction of the rear cover 140. The elastic sealing ring 400 has multiple first elastic protrusions 450. The multiple first elastic protrusions 450 are clamped into the multiple first clamping grooves 1441 one to one to achieve a connection between the mounting boss 144 and the elastic sealing ring 400, improving the connection strength between the mounting boss 144 and the elastic sealing ring 400 and reducing the likelihood of separation between the elastic sealing ring 400 and the rear cover 140.

In some embodiments, as shown in FIG. 17 and FIG. 18, the mounting boss 144 includes a first boss surface 1442 and a second boss surface 1443 opposite to each other along the axial direction of the rear cover 140 (that is, the second direction Y). Multiple first clamping grooves 1441 are disposed on the first boss surface 1442. Multiple second clamping grooves 1444 are disposed on the second boss surface 1443. The multiple first clamping grooves 1441 and the multiple second clamping grooves 1444 are alternately disposed in the circumferential direction of the rear cover 140, making the first clamping grooves 1441 and the second clamping grooves 1444 deeper. The elastic sealing ring 400 also includes multiple second elastic protrusions 460. The multiple second elastic protrusions 460 are clamped into the multiple second clamping grooves 1444 one to one. This better improves the connection strength between the elastic sealing ring 400 and the mounting boss 144. The first clamping grooves 1441 and the second clamping grooves 1444 can limit the elastic sealing ring 400 to prevent the elastic sealing ring 400 from moving relative to the mounting boss 144 in the second direction Y, limiting the elastic sealing ring 400 in the second direction Y. Moreover, the first clamping grooves 1441 and the second clamping grooves 1444 are alternately disposed in the circumferential direction of the rear cover 140 and do not communicate with each other so that the first clamping grooves 1441 and the second clamping grooves 1444 can cooperate with each other to limit the movement of the elastic sealing ring 400 in the radial direction of the rear cover 140. This ensures that the elastic sealing ring 400 can be secured to the mounting boss 144.

In some embodiments, when the elastic sealing ring 400 includes the sealing ring body 440, as shown in FIG. 16, one end face of the sealing ring body 440 in the axial direction of the rear cover 140 is flush with the first boss surface 1442, and the other end face of the sealing ring body 440 in the axial direction of the rear cover 140 is flush with the second boss surface 1443. In this manner, the sealing ring body 440 can have a large connection area with the mounting boss 144, ensuring connection strength and reducing material consumption.

Illustratively, the elastic sealing ring 400 may be injection molded on the edge of the rear cover 140, that is, the elastic sealing ring 400 is injection molded on the mounting boss 144, better enhancing the connection strength between the elastic sealing ring 400 and the rear cover 140 and reducing the likelihood of separation between the elastic sealing ring 400 and the rear cover 140. The elastic sealing ring 400 may also be connected to the rear cover 140 in other manners. This is not limited by this embodiment.

In some embodiments, as shown in FIG. 3 or FIG. 17, the rear cover 140 is provided with a mounting groove 145 on the surface of the rear cover 140 facing the mounting shell body 130, and the surface of the rear cover 140 facing away from the mounting shell body 130 is an outer cover surface 146. The bottom wall of the mounting groove 145 and the outer cover surface 146 are both provided with radial first reinforcing ribs 141. The first reinforcing ribs 141 are used for increasing the structural strength of the rear cover 140, reducing the likelihood of damage to the rear cover 140, and ensuring uniform force distribution on the rear cover 140. The first reinforcing ribs 141 of this embodiment are radial to uniformly increase the structural strength of all parts of the rear cover 140, ensuring the overall strength of the rear cover 140.

In this embodiment, the bottom of the mounting groove 145 is provided with an energy-absorbing groove 147. The energy-absorbing groove 147 extends along the axial direction of the rear cover 140. A reinforcing boss 142 is disposed on the outer cover surface 146. The first reinforcing ribs 141 avoid the reinforcing boss 142. The energy-absorbing grooves 147 can buffer the impact force on the rear cover 140, reducing the noise of the fan casing.

In the fan casing of this embodiment, an assembly opening 1301 on the mounting shell body 130 is provided with a rear cover 140, so that the rear cover 140 can isolate the noise from the tail of the blower assembly, preventing the noise from spreading outwards. The first reinforcing ribs 141 and the reinforcing boss 142 ensure the structural strength of the rear cover 140 and maintain uniform stress distribution on the rear cover 140. The energy-absorbing groove 147 at the bottom of the mounting groove 145 can buffer the impact force on the rear cover 140, better reducing the noise produced by the fan casing, minimizing the overall noise produced by the fan casing, better reducing the noise that disperses outwards, and enabling the blower assembly that uses the fan casing to operate with a low noise.

In some embodiments, multiple reinforcing bosses 142 are provided, that is, multiple energy-absorbing grooves 147 are provided. The multiple reinforcing bosses 142 are symmetrical on the outer cover surface 146 of the rear cover 140 to uniformly increase the structural strength of the rear cover 140 and evenly buffer the impact force on the rear cover 140, better improving the uniformity of the stress distribution on the rear cover 140 and better reducing the noise of the fan casing. In this embodiment, there are two reinforcing bosses 142 symmetrical about the axis of the rear cover 140.

In some embodiments, as shown in FIG. 17, the energy-absorbing groove 147 is provided with a horizontal plate 148 and a vertical plate 149 perpendicular to each other and connected to each other. The horizontal plate 148 and the vertical plate 149 divide the energy-absorbing groove 147 into multiple energy-absorbing subgrooves. In this manner, each energy-absorbing subgroove is able to serve as an energy-absorbing space for dispersing, through the horizontal plate 148 and vertical plate 149, the impact force transmitted to the rear cover 140 can be dispersed, better improving the buffering effect of the energy-absorbing groove 147 and better enhancing the noise reduction effect.

The energy-absorbing groove 147 may also not be provided with a horizontal plate 148 and a vertical plate 149. This is not limited by this embodiment. When multiple energy-absorbing grooves 147 are provided, some energy-absorbing grooves 147 may have a horizontal plate 148 and a vertical plate 149 while others may not have a horizontal plate 148 and a vertical plate 149. This is not limited by this embodiment.

In this embodiment, the rear cover 140 and the heat dissipation member 200 cooperate to form an accommodating space for accommodating the circuit board 800. The mounting groove 145 of the rear cover 140 and the heat dissipation plate 201 cooperate to form an accommodating space. The circuit board 800 is placed in the accommodating space. The rear cover 140 is also provided with a socket hole. The socket hole is used for the wiring block 700 to pass through, allowing the wiring block 700 to be electrically connected to the circuit board 800 smoothly.

Illustratively, as shown in FIG. 18, the outer cover surface 146 includes a first step surface 1461 and a second step surface 1462. The first step surface 1461 and the second step surface 1462 are arranged in a stepped manner. The first step surface 1461 is closer to the mounting shell body 130 than the second step surface 1462, meaning that the second step surface 1462 protrudes from the first step surface 1461. The second step surface 1462 includes a flat region and a reinforcing rib region. The reinforcing bosses 142 are disposed in the flat region. The first reinforcing ribs 141 are disposed in the reinforcing rib region and on the first step surface 1461. By configuring the outer cover surface 146 in a stepped structure, on one hand, it facilitates the mounting of the wiring block 700 such that the socket of the wiring block 700 can face one side of the rear cover 140 instead of facing the bottom of the rear cover 140, and on the other hand, the stepped design of the outer cover surface 146 can enable the formation of two subgrooves of different depths in the mounting groove 145, which further enhances the energy-absorbing effect of the rear cover 140.

In some embodiments, as shown in FIG. 18, third reinforcing ribs **14*a* are disposed between the first step surface 1461 and the second step surface 1462 and used for increasing the structural strength of the rear cover 140**.

Illustratively, third reinforcing ribs **14*a* are disposed between the reinforcing bosses 142 and the second step surface 1462 and used for enhancing the connection strength between the reinforcing bosses 142 and the second step surface 1462**.

Figure 19:
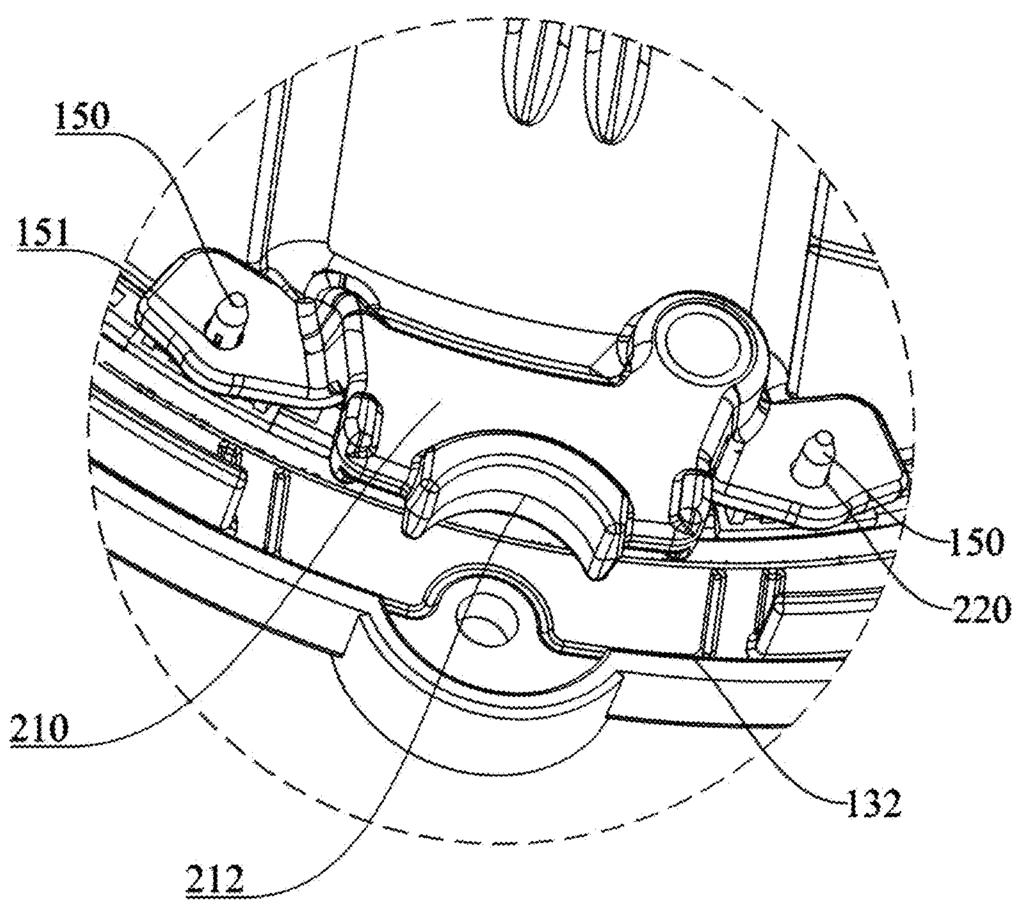
FIG. 19 is a partial enlarged view of an assembly of a rear cover and a heat dissipation member according to an embodiment of the present disclosure.

In some embodiments, as shown in FIG. 19, the rear cover 140 is provided with positioning pillars 150. The peripheral surface of each positioning pillar 150 is provided with an elastic support protrusion 151. The heat dissipation member 200 is provided with positioning holes 220. The positioning pillars 150 pass through the positioning holes 220. The elastic support protrusion 151 is able to be abutted against the hole wall of the corresponding positioning hole 220. The positioning pillars 150 and the positioning holes 220 facilitate positioning and mounting of the rear cover 140 and the heat dissipation member 200. Moreover, the elastic support protrusions 151 facilitate centering of the heat dissipation plate 201 and prevent rigid collisions between the positioning pillars 150 and the heat dissipation plate 201, better reducing noise produced during the operation of the fan casing.

The present disclosure further provides a vehicle air conditioning system. The vehicle air conditioning system includes the blower assembly. During operation, the vehicle air conditioning system produces a low noise, improving the user comfort.

In the blower assembly of this embodiment, during operation, the circuit board 800 supplies current to the enameled wire 511. When energized, the enameled wire 511 generates a magnetic field to drive the magnetic tile 520 to rotate. The magnetic tile 520 drives the housing 530 and the impeller 600 to rotate through the rotary shaft 540, achieving power output. When operating, the stator-rotor assembly 500 generates vibrations, causing the heat dissipation member 200 to move relative to the mounting shell body 130 and the rear cover 140. The heat dissipation member 200 is connected to the mounting shell body 130 via the damping member 310, preventing collisions between the heat dissipation member 200 and the mounting shell body 130 and avoiding a large noise. The elastic sealing ring 400 disposed between the heat dissipation member 200 and the rear cover 140 prevents direct collisions between the heat dissipation member 200 and the rear cover 140, avoiding a large noise. The skirt portion 410 of the elastic sealing ring 400 is located between the rear cover 140 and the mounting shell body 130, preventing collisions between the mounting shell body 130 and the rear cover 140 and avoiding a large noise. Consequently, the blower assembly of this embodiment produces a low noise. Additionally, vibrations from the stator-rotor assembly 500 are uniformly transmitted to the rear cover 140. The rear cover 140 provided with the first reinforcing ribs 141 and the reinforcing bosses 142 has a high structural strength, preventing noise dispersion through the rear cover 140 and better lowering the overall noise of the blower assembly.

It is to be noted that the preceding are only preferred embodiments of the present disclosure and technical principles used therein. It is to be understood by those skilled in the art that the present disclosure is not limited to the embodiments described herein. Those skilled in the art can make various apparent modifications, adaptations, and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A fan casing, comprising:

a mounting shell provided with a plurality of limiting grooves and a mounting space for holding a stator-rotor assembly;

a heat dissipation member comprising a heat dissipation plate located inside the mounting shell, wherein a plurality of securing portions are disposed at an edge of the heat dissipation plate; and a damping assembly comprising a plurality of damping members, wherein the plurality of damping members are spaced apart along a first direction, a damping member of the plurality of damping members is disposed in a corresponding limiting groove, an end of the damping member in the first direction, an end of the damping member in a second direction, and an end of the damping member facing away from a central axis of the mounting shell are abutted against a groove wall of the corresponding limiting groove, and a pocket groove is disposed at an end of the damping member facing the central axis of the mounting shell, pocket grooves on the plurality of damping members are in one-to-one correspondence with the plurality of securing portions, and each securing portion of the plurality of securing portions is limited in a corresponding pocket groove;

wherein the first direction is a circumferential direction of the mounting shell, the second direction is perpendicular to the first direction, and the second direction is an axial direction of the mounting shell; and wherein an extending protrusion is disposed at an end face of the end of the damping member facing the central axis of the mounting shell and configured to contact a part of the heat dissipation plate, wherein the part of the heat dissipation plate is a part other than the plurality of securing portions.

2. The fan casing of claim 1, wherein the securing portion is clamped in the corresponding pocket groove in the second direction.

3. The fan casing of claim 2, wherein the damping member has at least one clamping group, at least part of each of the at least one clamping group is located inside the pocket groove corresponding to the damping member, a clamping group of the at least one clamping group comprises two clamping blocks opposite to each other in the second direction, and the securing portion corresponding to the damping member is clamped between the two clamping blocks.

4. The fan casing of claim 3, wherein two surfaces of the securing portion in the second direction are each provided with a plurality of protrusions, the plurality of protrusions are spaced apart along the first direction and located inside the pocket groove corresponding to the securing portion, and one clamping block is disposed between two protrusions adjacent in the first direction and on a same surface of the two surfaces of the securing portion.

5. The fan casing of claim 1, wherein the damping member is provided with a mounting through hole passing through the damping member along the second direction, a plurality of ribs extending along the second direction are disposed on an inner wall of the mounting through hole, and the mounting shell has a damping column passing through the mounting through hole.

6. The fan casing of claim 2, wherein the damping member is provided with a mounting through hole passing through the damping member along the second direction, a plurality of ribs extending along the second direction are disposed on an inner wall of the mounting through hole, and the mounting shell has a damping column passing through the mounting through hole.

7. The fan casing of claim 3, wherein the damping member is provided with a mounting through hole passing through the damping member along the second direction, a plurality of ribs extending along the second direction are disposed on an inner wall of the mounting through hole, and the mounting shell has a damping column passing through the mounting through hole.

8. The fan casing of claim 4, wherein the damping member is provided with a mounting through hole passing through the damping member along the second direction, a plurality of ribs extending along the second direction are disposed on an inner wall of the mounting through hole, and the mounting shell has a damping column passing through the mounting through hole.

9. The fan casing of claim 5, wherein the pocket groove has an arc-shaped groove wall, the arc-shaped groove wall curves away from the central axis of the mounting shell, the securing portion comprises an arc-shaped fitting surface, and the arc-shaped fitting surface is abutted against the arc-shaped groove wall.

10. The fan casing of claim 1, wherein two abutting end walls of the damping member in the first direction are each an inclined wall, and a length of an end of the damping member facing the central axis of the mounting shell is less than a length of an end of the damping member facing away from the central axis of the mounting shell, wherein the length of the end of the damping member facing the central axis of the mounting shell and the length of the end of the damping member facing away from the central axis of the mounting shell are each a length extending along the first direction.

11. The fan casing of claim 2, wherein two abutting end walls of the damping member in the first direction are each an inclined wall, and a length of an end of the damping member facing the central axis of the mounting shell is less than a length of an end of the damping member facing away from the central axis of the mounting shell, wherein the length of the end of the damping member facing the central axis of the mounting shell and the length of the end of the damping member facing away from the central axis of the mounting shell are each a length extending along the first direction.

12. The fan casing of claim 3, wherein two abutting end walls of the damping member in the first direction are each an inclined wall, and a length of an end of the damping member facing the central axis of the mounting shell is less than a length of an end of the damping member facing away from the central axis of the mounting shell, wherein the length of the end of the damping member facing the central axis of the mounting shell and the length of the end of the damping member facing away from the central axis of the mounting shell are each a length extending along the first direction.

13. The fan casing of claim 4, wherein two abutting end walls of the damping member in the first direction are each an inclined wall, and a length of an end of the damping member facing the central axis of the mounting shell is less than a length of an end of the damping member facing away from the central axis of the mounting shell, wherein the length of the end of the damping member facing the central axis of the mounting shell and the length of the end of the damping member facing away from the central axis of the mounting shell are each a length extending along the first direction.

14. A fan casing, comprising:

a mounting shell provided with a plurality of limiting grooves and a mounting space for holding a stator-rotor assembly;

a heat dissipation member comprising a heat dissipation plate located inside the mounting shell, wherein a plurality of securing portions are disposed at an edge of the heat dissipation plate; and a damping assembly comprising a plurality of damping members, wherein the plurality of damping members are spaced apart along a first direction, a damping member of the plurality of damping members is disposed in a corresponding limiting groove, an end of the damping member in the first direction, an end of the damping member in a second direction, and an end of the damping member facing away from a central axis of the mounting shell are abutted against a groove wall of the corresponding limiting groove, and a pocket groove is disposed at an end of the damping member facing the central axis of the mounting shell, pocket grooves on the plurality of damping members are in one-to-one correspondence with the plurality of securing portions, and each securing portion of the plurality of securing portions is limited in a corresponding pocket groove;

wherein the first direction is a circumferential direction of the mounting shell, the second direction is perpendicular to the first direction, and the second direction is an axial direction of the mounting shell;

wherein an outer wall of the damping member has an abutting protrusion that is abutted against the groove wall of the corresponding limiting groove; and an extending protrusion is disposed at an end face of the end of the damping member facing the central axis of the mounting shell and configured to contact a part of the heat dissipation plate, wherein the part of the heat dissipation plate is a part other than the plurality of securing portions.

15. A blower assembly, comprising a fan casing, wherein the fan casing comprises:

a mounting shell provided with a plurality of limiting grooves and a mounting space for holding a stator-rotor assembly;

a heat dissipation member comprising a heat dissipation plate located inside the mounting shell, wherein a plurality of securing portions are disposed at an edge of the heat dissipation plate; and a damping assembly comprising a plurality of damping members, wherein the plurality of damping members are spaced apart along a first direction, a damping member of the plurality of damping members is disposed in a corresponding limiting groove, an end of the damping member in the first direction, an end of the damping member in a second direction, and an end of the damping member facing away from a central axis of the mounting shell are abutted against a groove wall of the corresponding limiting groove, and a pocket groove is disposed at an end of the damping member facing the central axis of the mounting shell, pocket grooves on the plurality of damping members are in one-to-one correspondence with the plurality of securing portions, and each securing portion of the plurality of securing portions is limited in a corresponding pocket groove;

wherein the first direction is a circumferential direction of the mounting shell, the second direction is perpendicular to the first direction, and the second direction is an axial direction of the mounting shell; and wherein an extending protrusion is disposed at an end face of the end of the damping member facing the central axis of the mounting shell and configured to contact a part of the heat dissipation plate, wherein the part of the heat dissipation plate is a part other than the plurality of securing portions.

16. A vehicle air conditioning system, comprising the fan casing according to claim 1.

* * * * *